US009184977B2

(12) United States Patent
Hakola et al.

(10) Patent No.: US 9,184,977 B2
(45) Date of Patent: Nov. 10, 2015

(54) SYSTEM FOR CONTROLLING ACCESS TO DEVICE-TO-DEVICE COMMUNICATION SERVICES IN WIRELESS NETWORK

(75) Inventors: Sami-Jukka Hakola, Kempele (FI); Samuli Turtinen, Ii (FI); Timo K. Koskela, Oulu (FI)

(73) Assignee: BROADCOM CORPORATION, Irvine, CA (US)

( * ) Notice: Subject to any disclaimer, the term of this patent is extended or adjusted under 35 U.S.C. 154(b) by 994 days.

(21) Appl. No.: 13/330,966

(22) Filed: Dec. 20, 2011

(65) Prior Publication Data
US 2013/0159522 A1   Jun. 20, 2013

(30) Foreign Application Priority Data
Dec. 19, 2011 (GB) .................................. 1121764.3

(51) Int. Cl.
| | |
|---|---|
| H04L 29/06 | (2006.01) |
| H04W 4/00 | (2009.01) |
| H04W 12/08 | (2009.01) |
| H04W 76/02 | (2009.01) |
| H04W 12/06 | (2009.01) |

(52) U.S. Cl.
CPC .......... *H04L 29/06* (2013.01); *H04L 29/06027* (2013.01); *H04L 63/0823* (2013.01); *H04W 4/005* (2013.01); *H04W 12/08* (2013.01); *H04W 76/023* (2013.01); *H04W 12/06* (2013.01)

(58) Field of Classification Search
CPC ............. H04L 29/06027; H04L 29/06; H04L 63/0823; H04L 63/104; H04L 12/14; H04W 4/005; H04W 4/00; H04W 12/08; H04W 76/023; H04W 74/006; H04W 36/08; H04W 24/10; H04M 3/16; G06F 21/14; G06F 17/30867; G01S 5/0263
See application file for complete search history.

(56) References Cited

U.S. PATENT DOCUMENTS

| | | | | |
|---|---|---|---|---|
| 2002/0087887 | A1 | 7/2002 | Busam et al. | 713/201 |
| 2004/0230797 | A1* | 11/2004 | Ofek et al. | 713/168 |
| 2005/0198377 | A1* | 9/2005 | Ferguson et al. | 709/238 |
| 2009/0063851 | A1 | 3/2009 | Nijdam | 713/155 |
| 2009/0265543 | A1* | 10/2009 | Khetawat et al. | 713/151 |
| 2009/0288138 | A1 | 11/2009 | Kalofonos | 726/2 |

(Continued)

OTHER PUBLICATIONS

EP Search Report under Section 17 for corresponding GB Patent Application No. 1121795.7 search issued Apr. 19, 2012.

*Primary Examiner* — Le H Luu
(74) *Attorney, Agent, or Firm* — Oblon, McClelland, Maier & Neustadt, L.L.P.

(57) ABSTRACT

Embodiments of the invention provide methods, devices and computer programs arranged to facilitate access to device-to-device (D2D) communication services in a communication network. One embodiment includes an apparatus for use in controlling access to a D2D communication service in a communication network, the apparatus including a processing system arranged to cause the apparatus to: receive a D2D discovery signal including data indicative of said D2D communication service; determine a verification state for the D2D communication service as one of a first verification state and a second, different, verification state, on the basis of said received D2D discovery signal, the first verification state being one in which said D2D communication service can be verified by the apparatus; and in the event that said D2D communication service is determined to be in the second verification state, transmit data indicative of said D2D communication service for verification by the communication network.

22 Claims, 7 Drawing Sheets

(56) References Cited

U.S. PATENT DOCUMENTS

| | | |
|---|---|---|
| 2010/0009675 A1 | 1/2010 | Wijting et al. |
| 2010/0093364 A1 | 4/2010 | Ribeiro et al. |
| 2011/0075675 A1* | 3/2011 | Koodli et al. ............ 370/401 |
| 2011/0106952 A1 | 5/2011 | Doppler et al. |
| 2011/0195737 A1* | 8/2011 | Kanazawa et al. ........... 455/509 |
| 2011/0321141 A1 | 12/2011 | Zeng et al. |
| 2012/0020213 A1 | 1/2012 | Horneman et al. |
| 2012/0083283 A1 | 4/2012 | Phan et al. |
| 2012/0094660 A1* | 4/2012 | Radulescu et al. ............ 455/434 |
| 2013/0137469 A1* | 5/2013 | Schmidt et al. ............... 455/466 |
| 2013/0294283 A1* | 11/2013 | Van Phan et al. ............. 370/252 |
| 2013/0303184 A1* | 11/2013 | Yang et al. ................ 455/456.1 |
| 2014/0274066 A1* | 9/2014 | Fodor et al. .................... 455/437 |

\* cited by examiner

SYSTEM FOR CONTROLLING ACCESS TO DEVICE-TO-DEVICE COMMUNICATION SERVICES IN WIRELESS NETWORK

TECHNICAL FIELD

The present invention relates to methods and apparatus for facilitating access to a device-to-device communication service. More particularly, embodiments relate to a mechanism for use in requesting access to a device-to-device communication service.

BACKGROUND

The following meanings for the abbreviations used in this specification apply:
CN core network
D2D device-to-device
eNB enhanced node B
eNodeB enhanced node B
EPC evolved packet core
EPS evolved packet system
EUTRAN Evolved Universal Terrestrial Radio Access Network
ID identification
LTE Long Term Evolution
LTE-A LTE Advanced
MAC medium access control
MME mobility management entity
PLMN public land mobile network
RB radio bearer
RRC radio resource control
S-GW service gateway
SIB system information block
SRB signalling radio bearer
UE user equipment
UL uplink In the last few years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) communication networks like the Universal Mobile Telecommunications System (UMTS), enhanced communication networks based e.g. on LTE, cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN), Bluetooth or Worldwide Interoperability for Microwave Access (WiMAX), took place all over the world. Various organisations, such as the 3rd Generation Partnership Project (3GPP), Telecoms & Internet converged Services & Protocols for Advanced Networks (TISPAN), the International Telecommunication union (ITU), 3rd Generation Partnership Project 2 (3GPP2), Internet Engineering Task Force (IETF), the IEEE (Institute of Electrical and Electronics Engineers), the WiMAX Forum and the like, are working on standards for telecommunication network and access environments.

Recently, so-called "proximity-based" applications and services came into the focus of further developments in the field of telecommunications. The term proximity-based applications and services may be used, for example, in cases where two or more devices (i.e. two or more users), which are close to each other, are interested in exchanging data, if possible, directly with each other. Currently, such "proximity-based" applications operate fully "over the top" and are based on "high-level software", typically relying on a mix of GPS location and of the 3GPP mobile systems used as "data pipes".

However, such an approach presents fundamental technology limitations from the point of view of e.g. device battery life (due to the extensive GPS usage), signalling load to the network (due to the required uplink bursty traffic) and simplicity (due to the "proactive" behaviour required of the user, e.g. the "check in").

While the use of an unlicensed-spectrum communication can address some of the aspects mentioned earlier, it still presents some limitations. For example, discovery processes are being defined based on direct message exchanges which are thus not optimal for operation over longer ranges (hundreds of metres or more), or preserve a reasonable battery life. For the same reason, an unlicensed option cannot be expected to scale among a large number of devices.

For future cellular communication networks, a possible method for such proximity-based applications and services is the so-called device-to-device (D2D) communication. D2D offers a high communication speed, large capacity and a high quality of service, which are important features to be achieved. Advantages achievable by the implementation of D2D communications in the cellular communication environment are, for example, an offloading of the cellular system, reduced battery consumption due to lower transmission power, an increased data rate, an improvement in local area coverage robustness to infrastructure failures and also an enablement of new services. This is possible while also providing access to licensed spectrum with a controlled interference environment to avoid the uncertainties of license exempt band. Due to this, D2D communication gains more and more attraction and interest.

However, in order to make D2D communication feasible in communication networks, such as those based on 3GPP LTE systems, it is necessary to provide a fast and efficient mechanism for requesting access to D2D services.

Embodiments are directed towards providing an improved method of requesting access to D2D services in communication networks.

SUMMARY

In a first exemplary embodiment there is provided an apparatus for use in controlling access to a device-to-device (D2D) communication service in a communication network, the apparatus comprising at least one processor and at least one memory including computer program code, the at least one memory and the computer program code being configured to, with the at least one processor, cause the apparatus at least to: receive a D2D discovery signal comprising data indicative of said D2D communication service; determine a verification state for the D2D communication service as one of a first verification state and a second, different, verification state, on the basis of said received D2D discovery signal, the first verification state being one in which said D2D communication service can be verified by the processing system; and in the event that said D2D communication service is determined to be in the second verification state, transmit data indicative of said D2D communication service for verification by the communication network.

In a second exemplary embodiment there is provided a method of controlling access to a device-to-device (D2D) communication service in a communication network, the method comprising: receiving a D2D discovery signal comprising data indicative of said D2D communication service; determining a verification state for the D2D communication service as one of a first verification state and a second, different, verification state, on the basis of said received D2D discovery signal, the first verification state being one in which said D2D communication service can be verified; and in the event that said D2D communication service is determined to be in the second verification state, transmitting data indicative of said D2D communication service for verification by the communication network.

The first and second exemplary embodiments are most conveniently implemented in a UE. Embodiments also include a computer program comprising a set of instructions, which, when executed by a UE, cause the UE to perform a method according to the second embodiment.

In a third exemplary embodiment there is provided an apparatus for use in controlling access to a device-to-device (D2D) communication service provided to a D2D device in a communication network, the apparatus comprising at least one processor and at least one memory including computer program code, the at least one memory and the computer program code being configured to, with the at least one processor, cause the apparatus at least to: receive a first message comprising data indicative of said D2D communication service; verify whether said D2D communication service is authorised for said communication network; and transmit a second message comprising data indicative of the result of said verification for reception by said D2D device.

In a fourth exemplary embodiment there is provided a method of controlling access to a device-to-device (D2D) communication service provided to a D2D device in a communication network, the method comprising: receiving a first message comprising data indicative of said D2D communication service; verifying whether said D2D communication service is authorised for said communication network; and transmitting a second message comprising data indicative of the result of said verification for reception by said D2D device.

The third and fourth exemplary embodiments are most conveniently implemented in a service gateway. Embodiments also include a computer program comprising a set of instructions, which, when executed by a service gateway, cause the service gateway to perform a method according to the fourth embodiment.

In a fifth exemplary embodiment there is provided an apparatus for use in facilitating access to a device-to-device (D2D) communication service provided to a D2D device in a communication network, the apparatus comprising at least one processor and at least one memory including computer program code, the at least one memory and the computer program code being configured to, with the at least one processor, cause the apparatus at least to: receive a first message comprising a first indication whether said D2D device is authorised for said communication network; receive a second message comprising a second indication whether said D2D communication service is authorised for said communication network; transmit a third message for reception by the D2D device, the third message comprising a combination of the indication of the first and second indications.

In a sixth exemplary embodiment there is provided a method of facilitating access to a device-to-device (D2D) communication service provided to a D2D device in a communication network, the method comprising: receiving a first message comprising a first indication whether said D2D device is authorised for said communication network; receiving a second message comprising a second indication whether said D2D communication service is authorised for said communication network; and transmitting a third message for reception by the D2D device, the third message comprising a combination of the indication of the first and second indications.

The fifth and sixth exemplary embodiments are most conveniently implemented in a base station. Embodiments also include a computer program comprising a set of instructions, which, when executed by a base station, cause the base station to perform a method according to the sixth embodiment.

Further features and advantages of the invention will become apparent from the following description of preferred embodiments of the invention, given by way of example only, which is made with reference to the accompanying drawings.

DETAILED DESCRIPTION

Embodiments are concerned with controlling access to device-to-device (D2D) communication services in a communication network so as to prevent access to unauthorised D2D service providers.

In the following, examples and embodiments of the present invention are described with reference to the drawings. For illustrating the present invention, the examples and embodiments will be described in connection with a cellular communication network based on a 3GPP LTE system. However, it is to be noted that the present invention is not limited to an application using such types of communication system, but is also applicable in other types of communication systems and the like.

A basic system architecture of a communication network where examples of embodiments of the invention are applicable may comprise a commonly known architecture of one or more communication networks comprising a wired or wireless access network subsystem and a core network. Such an architecture may comprise one or more mobility management entities (MME), one or more access network control elements and radio access network elements, such as a base station (BS), eNodeB or eNB, with which a communication network element or device such as a UE or another device having a similar function, such as a modem chipset, a chip, a module etc., which can also be part of a UE or attached as a separate element to a UE, or the like, is able to communicate via one or more channels for transmitting several types of data.

The network is in communication with various D2D management entities, namely a service gateway, a D2D registration server and a packet gateway, which control provisioning of D2D communication services.

The general functions and interconnections of the described elements, which also depend on the actual network type, are known to those skilled in the art and described in corresponding specifications, so that a detailed description thereof is omitted herein. However, it is to be noted that several additional network elements and signalling links may be employed for a communication connection to or from UEs or eNBs, besides those described in detail herein below.

Figure 1:
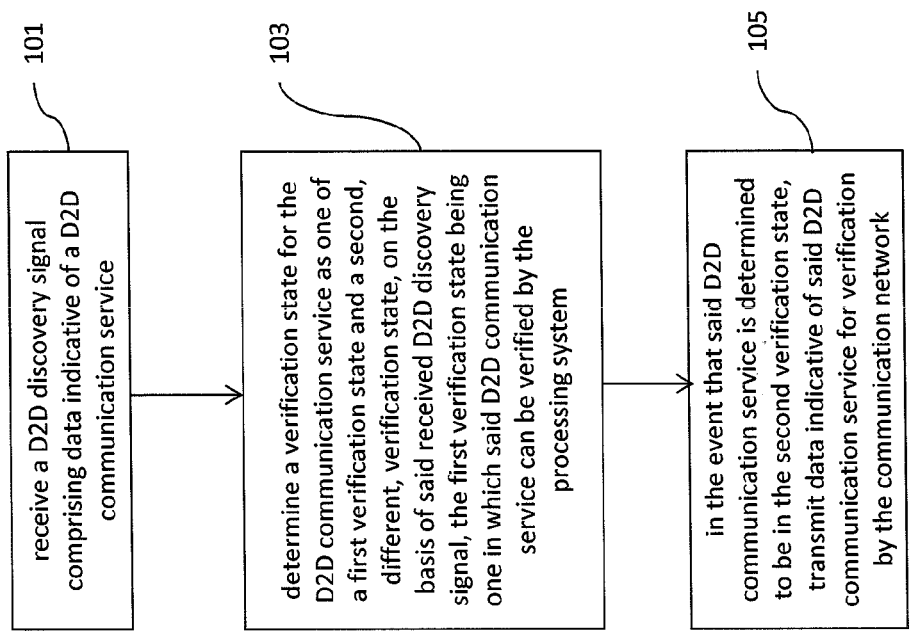
FIG. 1 is a logic flow diagram that illustrates the operation of a method, and a result of execution of computer program instructions embodied on a computer readable memory, in accordance with exemplary embodiments.
Figure 2:
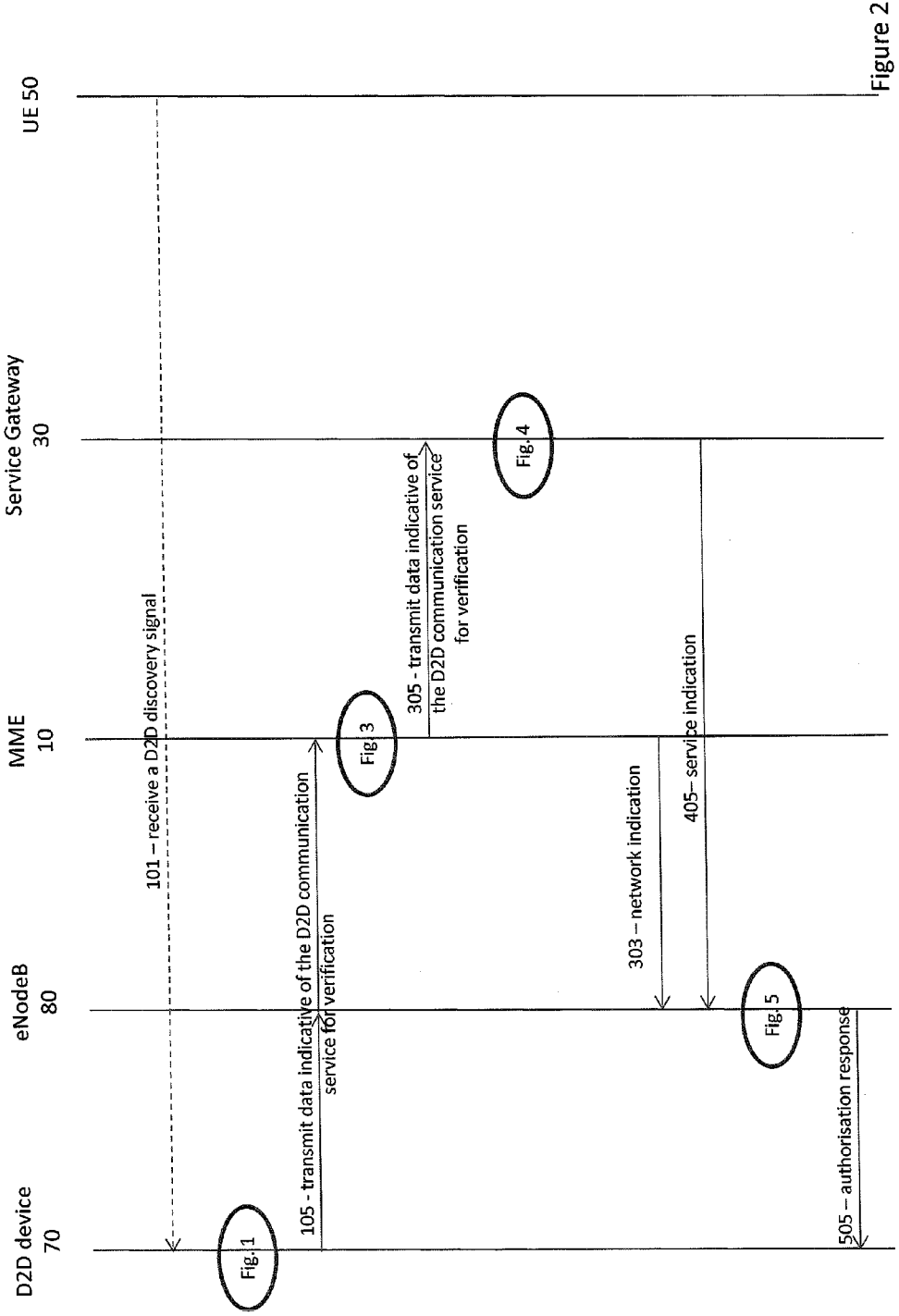
FIG. 2 is a flow diagram that illustrates the various steps performed by UE, mobility management entity, base station and service gateway according to embodiments.

Referring to FIGS. 1 and 2, in accordance with an exemplary embodiment, a UE 70 (hereinafter D2D device) receives a D2D discovery signal comprising data indicative of a D2D communication service (step 101). The D2D discovery signal may be received from a further UE 50 that is providing the D2D communication service. Thereafter, the D2D device 70 determines a verification state for the D2D communication service as one of a first verification state and a second, different, verification state, on the basis of said received D2D discovery signal (step 103). The first verification state is one in which said D2D communication service can be verified by the D2D device 70. By comparison, in the second verification state, the D2D communication service cannot be verified by the D2D device 70. In the event that the D2D communication service is determined to be in the second verification state, the D2D device 70 transmits data indicative of the D2D communication service, for example a service verification request, for verification by the communication network (step 105).

Embodiments thus provide a mechanism whereby D2D devices, such as the D2D device 70, can efficiently request verification of D2D communication services that cannot be locally verified. Furthermore, as D2D devices only request verification of D2D communication services that cannot be verified locally, the above-described network-based service verification mechanism represents an efficient utilisation of network resources.

In at least some arrangements, the service verification request transmitted by the D2D device 70 at step 105 is for receipt by a CN entity, such as the afore-mentioned MME 10 or the like. As is well known, control plane messages are transmitted using a Signal Radio Bearer (SRB), and their transmission is prioritised by the CN. Transmitting the service verification request in a control plane message is therefore advantageous in that it enables the verification requests to be transmitted as quickly as possible.

The control plane message may be a Non Access Stratum (NAS) message. For example, if the second D2D device 70 were in RRC_IDLE state, the D2D device 70 would transmit the NAS message in a RRC signalling message, so as to cause transition into a different RRC state, such as RRC_CONNECTED state. As described above, the RRC signalling message comprising the NAS message is for receipt by a CN entity, such as the MME 10, which, in response to receipt thereof, processes an RRC portion of the message according to conventional procedures, and transmits the service verification message comprised therein to a service verification entity, such as the afore-mentioned service gateway 30. It is to be noted that the MME 10 may additionally serve as a service verification entity, in which case, the MME 10 may additionally process the service verification request. The above-mentioned RRC signalling messages comprise a RRCConnectionRequest or a RRCConnectionSetupComplete message. The service verification message may alternatively comprise a non-3GPP dedicated tunneled information message.

Thus, the embodiments advantageously combine service verification with RRC connection establishment, thereby simultaneously causing the D2D device 70 to transit into a state in which it can access the D2D communication service. Accordingly, the embodiments enable fast and efficient service verification and access.

Figure 3:
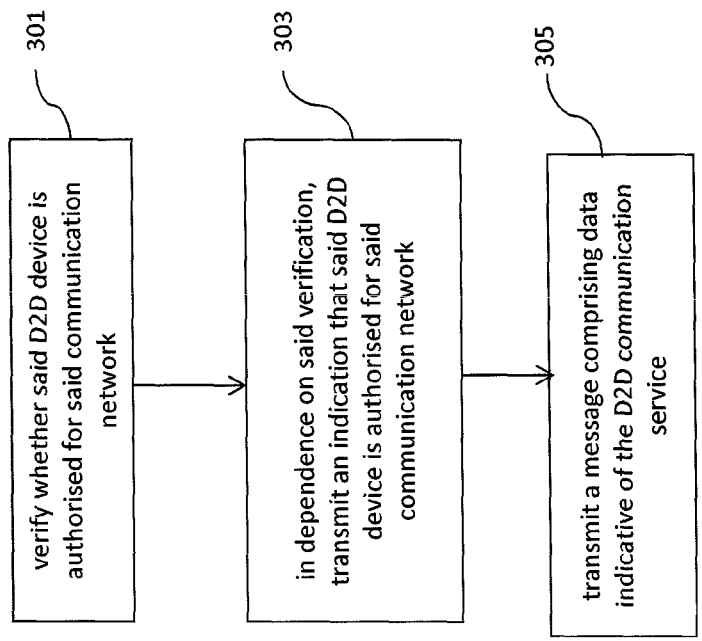
FIG. 3 is a logic flow diagram that illustrates the operation of a method, and a result of execution of computer program instructions embodied on a computer readable memory, in accordance with exemplary embodiments.

An overview of the steps performed by a CN entity, such the MME 10, in response to receiving an RRC signalling message comprising a service verification request will now be described with reference to FIGS. 2 and 3. In response to receiving a service verification request, the MME 10 verifies whether the D2D device 70 is authorised for the communication network (step 301). In dependence on said verification, the MME 10 transmits an indication, for example a network indication, that the D2D device 70 is authorised for the communication network for receipt by the D2D device 70 (step 303). Thereafter, the MME 10 transmits the service verification request to a service verification entity such as the service gateway 30 (step 305). As described above, the MME 10 may additionally serve as a service verification entity, in which case the transmission of the service verification request would be to a service verification component thereof.

Prior to transmitting the above-mentioned network indication and the service verification request, the MME 10 may additionally assign a service verification request identifier to the service verification request for use in identification of any subsequent messages in relation thereto, and transmit the assigned service verification request identifier with the network indication and the service verification request. This enables network entities to correlate network and service messages corresponding to a given service verification request. As will be explained in more detail below, the service verification request identifier may be used by a network entity, such as the above-mentioned eNodeB 80, in identifying a given service indication corresponding to a given network indication.

The MME 10 may additionally assign a validity condition with the service verification request, in which case the service verification request may only be considered valid by network entities, such as the afore-mentioned eNodeB 80, if the validity condition is satisfied. By contrast, when the validity condition is not satisfied, the service verification request may be considered invalid or expired. For example, the service verification request may include a validity time period.

An overview of the steps performed by a service verification entity, such the service gateway 30, in response to receiving a service verification request will now be described with reference to FIGS. 2 and 4. In response to receiving the service verification request (step 401), the service gateway 30 verifies whether the D2D communication service is authorised for the communication network (step 403). Thereafter, the service gateway 30 transmits a message, for example a service response message, comprising data indicative of the result of the verification, for example a service indication, for reception by the D2D device 70 (step 405).

When authorising a D2D communication service for the network, the service gateway 30 may assign a credential of a first type, for example a service credential, to the D2D communication service. In this case, the service gateway 30 may verify the D2D communication service on the basis the service credential assigned thereto.

In at least some arrangements, at step 401, an identifier corresponding to the D2D device 70 is received with the service verification request. For example, the identifier may comprise an MSISDN, IMSI or the like. In this case, the service gateway 30 may further determine whether the D2D device 70 is authorised to access the D2D communication service, thereby concluding network-related authorisation checks. As any necessary network authorisation checks are performed simultaneously, the service gateway 30 expedites access to the D2D communication service.

An overview of the steps performed by the eNodeB 80 when in receipt of the network and service indications will now be described with reference to FIGS. 2 and 5. In response to receiving a first message, for example a network response message, comprising the above-described network indication (step 501) and the above-described service response message comprising the above-described service indication (step 503), the eNodeB 80 transmits a message, for example an authorisation response message, comprising a combination of the network and service indications (step 505).

In effect, the authorisation response message is indicative of whether the D2D device 70 is authorised for the network and whether the D2D communication service is authorised for the network. Thus, for example, if the D2D device 70 is authorised but the D2D communication service is not, the D2D device 70 may not transition into the RRC_CONNECTED state, as described above. Therefore, embodiments enable full control of the D2D device 70 to provide a D2D communication service on the basis of the authorisation information as a whole.

The network response message received at step 501 may additionally comprise data indicative of the above-described validity condition. In this case, the eNodeB 80 may only consider the service response message if the validity condition is satisfied. For example, the validity condition may comprise a time period within which the service response message is to be received, in which, subsequent to expiry of the time period, the eNodeB 80 may transmit an indication for receipt by the D2D device 70 that an authorisation check for said D2D communication service has failed. In this case, the service verification message received after the expiry of the time period may be discarded. Therefore, the embodiments provide a mechanism for objectively considering service verification requests and for expiring them.

Further, the network response message received at step 501 may additionally comprise data indicative of the above-described service verification request identifier. In this case, the eNodeB 80 can identify a given service response message corresponding to a given network response message on the basis the service verification request identifier, for example, to prepare the above-described authorisation response message.

Turning to the steps carried out by the D2D device 70 in response to receiving the authorisation response message, the D2D device 70 may selectively request access to the D2D communication service provided by the UE 50. This D2D communication service access request is selective because it is at least dependent on the network and service authorisation indications. Furthermore, the D2D device 70 may require user intervention prior to requesting access, which may, for example, include a confirmation that access to the D2D communication service should be established.

In a preferred arrangement, the D2D device 70 may additionally maintain a list of D2D communication services determined or previously known to be in the above-described first verification state, and use this list for determining the verification state associated with the D2D communication service prior to transmitting the service verification request message at step 105. Furthermore, the D2D device 70 may continually update this list on the basis of received service indications. For example, if the service indication indicates that the D2D communication service is authorised for the network, the D2D device 70 may add data indicative of the D2D communication service to the list.

The above-described D2D discovery signal may additionally comprise data indicative of the above-described service credential. In this case, the D2D device 70 may determine the verification state associated with the D2D communication service on the basis of the service credential (step 103). The service gateway 30 may additionally provision a credential of a second type, for example a service verification credential, to the D2D device 70 for use in verifying the D2D communication service. In this case, the D2D device 70 may use the service verification credential transmitted thereto for determining the verification state associated with the D2D communication service at step 103. Thus, the embodiments define an efficient device-based service verification mechanism.

For completeness, it is noted that the service credential and the service verification credential may comprise a security key, a check word and/or an identifier.

Figure 6:
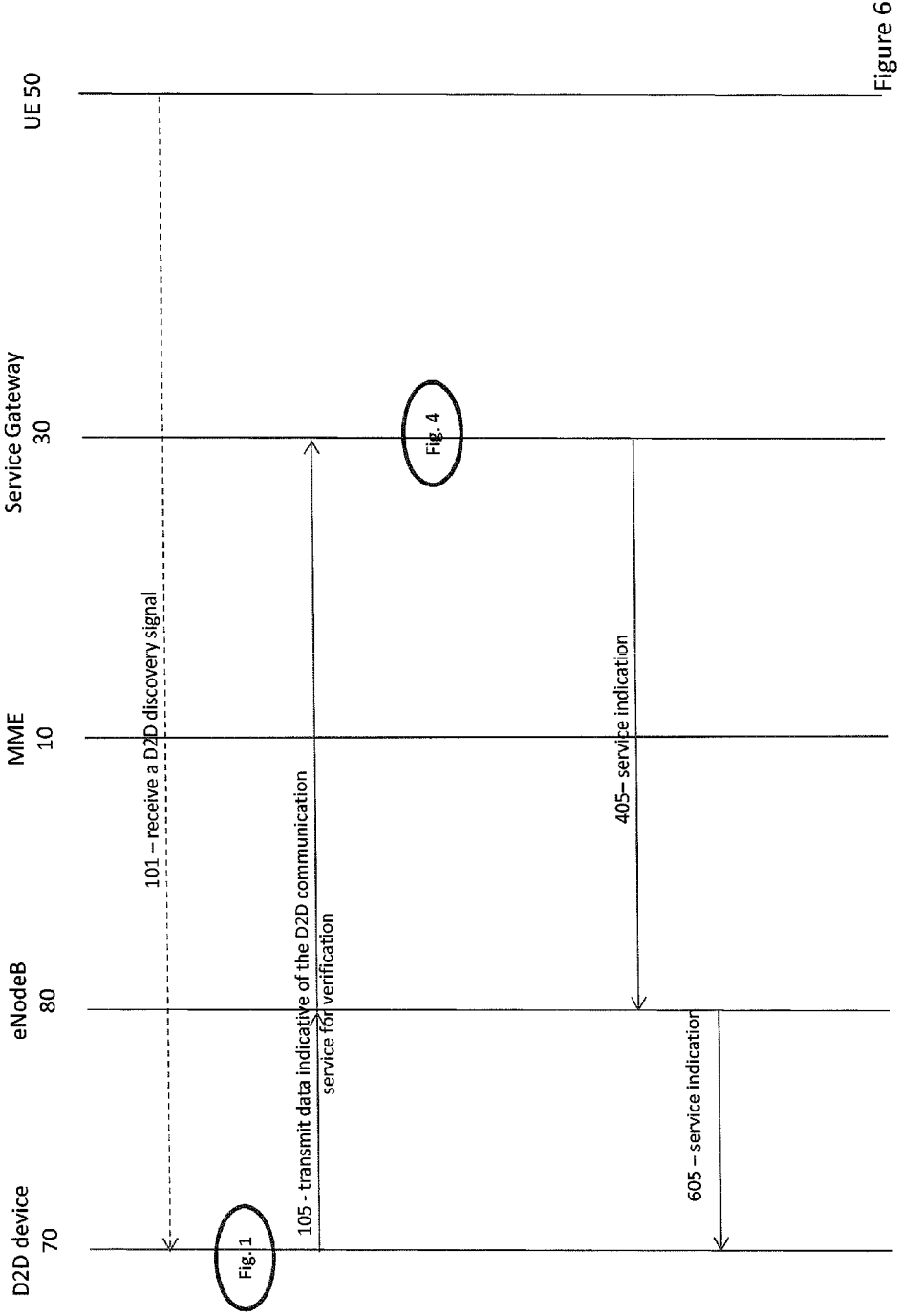
FIG. 6 is a flow diagram that illustrates the various steps performed by UE, mobility management entity, base station and service gateway according to embodiments.

In accordance with an alternative arrangement the service verification request may be transmitted in a user plane message. In this case, and referring to FIG. 6, the service verification request transmitted by the D2D device 70 at step 105 is for receipt by a service verification entity, such as the service gateway 30 or the like. In addition, to be able to transmit user plane messages, the D2D device 70 may have to be in an active RRC state, such as RRC_CONNECTED state.

The service gateway 30 may process the service verification request message as described above with reference to FIG. 4. Subsequently, the service gateway 30 transmits the above described service indication for receipt by the D2D device 70 (step 505). As described above, the service indication may be received by the eNodeB 80, which then transmits the received service indication to the D2D device 70 (step 605).

FIG. 1 is a logic flow diagram which describes, broadly, the above exemplary embodiments from the perspective of the D2D device 70.

Figure 4:
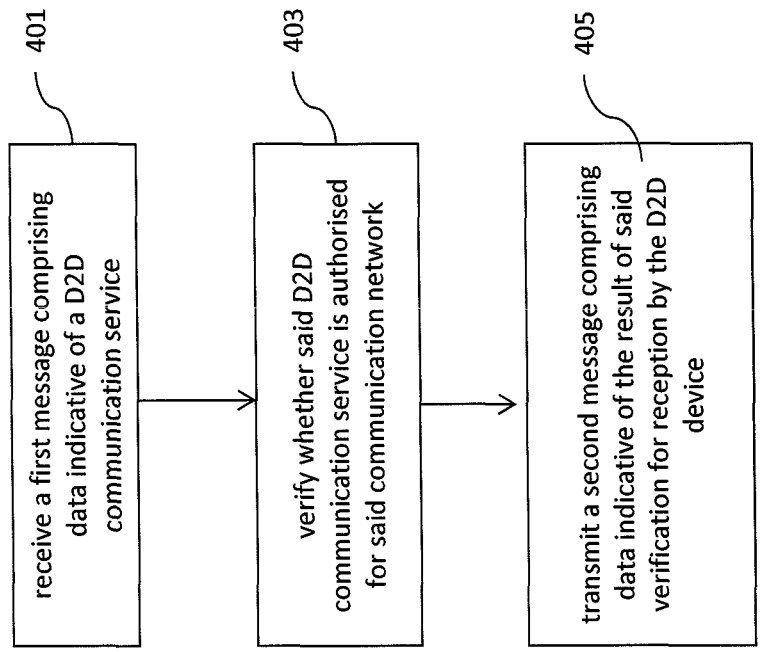
FIG. 4 is a logic flow diagram that illustrates the operation of a method, and a result of execution of computer program instructions embodied on a computer readable memory, in accordance with exemplary embodiments.

FIG. 4 is a logic flow diagram which describes, broadly, the above exemplary embodiments from the perspective of a service gateway 30.

Figure 5:
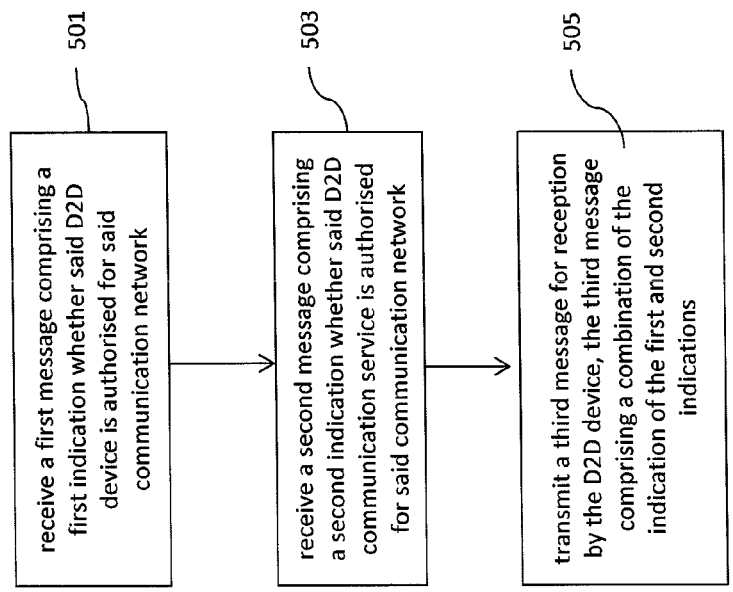
FIG. 5 is a logic flow diagram that illustrates the operation of a method, and a result of execution of computer program instructions embodied on a computer readable memory, in accordance with exemplary embodiments.

FIG. 5 is a logic flow diagram which describes, broadly, the above exemplary embodiments from the perspective of an eNodeB 80.

FIGS. 1, 4 and 5 represent results from executing a computer program or an implementing algorithm stored in the local memory of the service gateway 30, the eNodeB 80 and the D2D device 70 respectively as well as illustrating the operation of a method and a specific manner in which the processor and memory with computer program/algorithm are configured to cause the D2D device 70, the service gateway 30 and the eNodeB 80 respectively (or one or more components thereof) to operate. The various blocks shown in these Figures may also be considered as a plurality of coupled logic circuit elements constructed to carry out the associated function(s), or specific result or function of strings of computer program code stored in a computer readable memory. Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Figure 7:
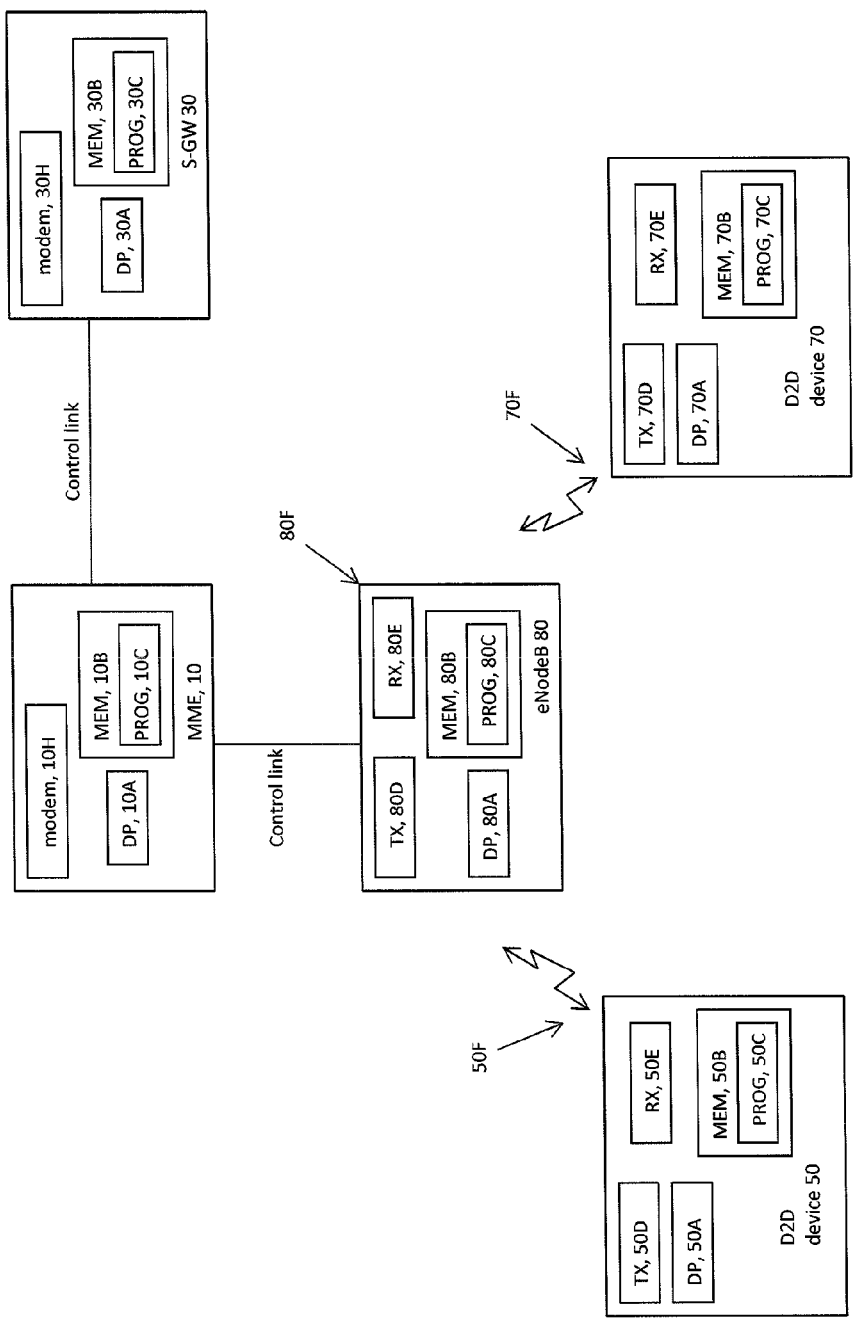
FIG. 7 is a simplified block diagram of various network devices, which are exemplary electronic devices suitable for use in practicing the exemplary embodiments.

Reference is now made to FIG. 7 for illustrating a simplified block diagram of various electronic devices and apparatus that are suitable for use in practicing the exemplary embodiments of this invention. In FIG. 7 an eNodeB 80 is adapted for communication over a wireless link with a mobile apparatus, such as a mobile terminal or devices 50 and 70. The eNodeB 80 may be a remote radio head or relay station, or other type of base station/cellular network access node.

The devices 50 and 70 include processing means such as at least one data processor (DP) 50A and 70A, storing means such as at least one computer-readable memory (MEM) 50B and 70B storing at least one computer program (PROG) 50C and 70C, and also communicating means such as a transmitter TX 50D and 70D and a receiver RX 50E and 70E for bidirectional wireless communications with the eNodeB 80 via one or more antennas 50F and 70F.

The eNodeB 80 includes its own processing means such as at least one data processor (DP) 80A, storing means such as at least one computer-readable memory (MEM) 80B storing at least one computer program (PROG) 80C, and communicating means such as a transmitter TX 80D and a receiver RX 80E for bidirectional wireless communications with other devices under its control via one or more antennas 80F. There is a data and/or control path, termed at FIG. 7 as a control link which in the LTE system may be implemented as an Si interface, coupling the eNodeB 80 with the MME 10 and over which the eNodeB 80 may receive the service, network and service authentication credentials in various embodiments above.

The MME 10 includes processing means such as at least one data processor (DP) 10A, storing means such as at least one computer-readable memory (MEM) 10B storing at least one computer program (PROG) 10C, and communicating means such as a transmitter TX 10D and a receiver RX 10E for bidirectional wireless communications with the eNodeB 80.

Similarly, the service gateway 30 includes processing means such as at least one data processor (DP) 30A, storing means such as at least one computer-readable memory (MEM) 30B storing at least one computer program (PROG) 30C, and communicating means such as a modem 30H for bidirectional communication with the MME 10 over the control link. While not particularly illustrated for the devices 50 and 70 and the eNodeB 80, those devices are also assumed to include as part of their wireless communicating means a modem which may be inbuilt on a radiofrequency RF front end chip within those devices 50, 70, 80 and which chip also carries the TX 50D/70D/80D and the RX 50E/70E/80E. The service gateway 30 also has stored in its local memory at 30G the database which has the data suitable for authorising all D2D communication services authorised for the network and data suitable for determining which D2D devices are authorised to access them, as the case may be for the various embodiments detailed above.

At least one of the PROGs 70C in the UE 70 is assumed to include program instructions that, when executed by the associated DP 70A, enable the device to operate in accordance with the exemplary embodiments of this invention, as detailed above. The eNodeB 80 and the service gateway 30 also have software stored in their respective MEMs to implement certain aspects of these teachings. In these regards the exemplary embodiments of this invention may be implemented at least in part by computer software stored on the MEM 70B, 80B, 30B which is executable by the DP DP 70A of the device 70, DP 80A of the eNodeB 80 and/or DP 30A of the service gateway 30A, or by hardware, or by a combination of tangibly stored software and hardware (and tangibly stored firmware). Electronic devices implementing these aspects of the invention need not be the entire devices as depicted at FIG. 7, but exemplary embodiments may be implemented by one or more components of same such as the above described tangibly stored software, hardware, firmware and DP, or a system on a chip SOC or an application specific integrated circuit ASIC.

Various embodiments of the computer readable MEMs 10B, 30B, 50B, 70B and 80B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 10A, 30A, 50A, 70A and 80A include but are not limited to general purpose computers, special purpose computers, microprocessors, digital signal processors (DSPs) and multi-core processors.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. Apparatus for use in controlling access to a device-to-device (D2D) communication service in a communication network, the apparatus comprising at least one processor and at least one memory including computer program code, the at least one memory and the computer program code being configured to, with the at least one processor, cause the apparatus at least to:
   receive a D2D discovery signal comprising data indicative of said D2D communication service;
   determine a verification state for the D2D communication service as one of a first verification state and a second, different, verification state, on the basis of said received D2D discovery signal, the first verification state being one in which said D2D communication service can be verified by the apparatus; and
   in the event that said D2D communication service is determined to be in the second verification state, transmit data indicative of said D2D communication service for verification by the communication network.

2. Apparatus according to claim 1, wherein the at least one memory and the computer program code is configured to transmit data indicative of said D2D communication service in a Non Access Stratum (NAS) message.

3. Apparatus according to claim 2, wherein, while in a Radio Resource Control (RRC) idle operative mode, the at least one memory and the computer program code is configured to transmit said NAS message in a RRC signalling message, so as to cause the apparatus to transition into an RRC operative mode other than said RRC idle operative mode.

4. Apparatus according to claim 3, wherein said RRC signalling message comprises a RRCConnectionRequest or a RRCConnectionSetupComplete message.

5. Apparatus according to claim 1, wherein at least one memory and the computer program code is configured to transmit data indicative of said D2D communication service in a non-3GPP dedicated information message.

6. Apparatus according to claim 1, wherein responsive to receipt of an indication that said D2D communication service is verified by the communication network, the at least one memory and the computer program code is further configured to request access to said D2D communication service.

7. Apparatus according to claim 1, wherein the at least one memory and the computer program code is further configured to:
   maintain a list of D2D communication services determined to be in the first verification state; and
   use said list in performing said determination of the verification state.

8. Apparatus according to claim 7, wherein, responsive to receipt of an indication that said D2D communication service is verified by the communication network, the at least one memory and the computer program code is further configured to add data indicative of said D2D communication service to said list.

9. Apparatus according to claim 1, wherein the D2D discovery signal comprises data indicative of a credential of a first type, said credential of the first type being suitable for use in verification of said D2D communication service, wherein the at least one memory and the computer program code is configured to perform said determination of verification state on the basis of said credential of the first type.

10. Apparatus according to claim 1, wherein the at least one memory and the computer program code is configured to:
    receive a credential of a second type; and
    use the credential of the second type to determine said verification state.

11. Apparatus according to claim 1, wherein the apparatus comprises a modem.

12. A method of controlling access to a device-to-device (D2D) communication service in a communication network, the method comprising:
    receiving a D2D discovery signal comprising data indicative of said D2D communication service;
    determining a verification state for the D2D communication service as one of a first verification state and a second, different, verification state, on the basis of said received D2D discovery signal, the first verification state being one in which said D2D communication service can be verified; and
    in the event that said D2D communication service is determined to be in the second verification state, transmitting data indicative of said D2D communication service for verification by the communication network.

13. Apparatus for use in controlling access to a device-to-device (D2D) communication service provided to a D2D device in a communication network, the apparatus comprising at least one processor and at least one memory including computer program code, the at least one memory and the computer program code being configured to, with the at least one processor, cause the apparatus at least to perform:
    receive a first message comprising data indicative of said D2D communication service;
    verify whether said D2D communication service is authorised for said communication network; and
    transmit a second message comprising data indicative of the result of said verification for reception by said D2D device.

14. Apparatus according to claim 13, wherein the at least one memory and the computer program code is configured to perform said verification on the basis of a credential having been assigned to the D2D communication service by the apparatus.

15. Apparatus according to claim 13, wherein the first message comprises an identifier corresponding to the D2D device.

16. Apparatus according to claim 15, wherein the at least one memory and the computer program code is further configured to determine whether said D2D device is authorised to access said D2D communication service on the basis of said identifier.

17. A service gateway comprising the apparatus according to claim 13.

18. Apparatus for use in facilitating access to a device-to-device (D2D) communication service provided to a D2D device in a communication network, the apparatus comprising at least one processor and at least one memory including computer program code, the at least one memory and the computer program code being configured to, with the at least one processor, cause the apparatus at least to perform:
    receive a first message comprising a first indication whether said D2D device is authorised for said communication network;
    receive a second message comprising a second indication whether said D2D communication service is authorised for said communication network; and
    transmit a third message for reception by the D2D device, the third message comprising a combination of the indication of the first and second indications.

19. Apparatus according to claim 18, wherein the first message specifies a time period within which said second message is to be received, wherein, subsequent to expiry of said time period, the at least one memory and the computer program code is selectively configured to transmit an indication that an authorisation check for said D2D communication service has failed.

20. Apparatus according to claim 19, wherein, responsive to receipt of said second message subsequent to expiry of said time period, the at least one memory and the computer program code is configured to discard said second message.

21. Apparatus according to claim 18, wherein the at least one memory and the computer program code is configured to identify a given said second message corresponding to a given said first message on the basis of an identifier comprised therein.

22. A base station comprising the apparatus according to claim 18.

* * * * *